(12) United States Patent
Veres et al.

(10) Patent No.: US 12,007,494 B2
(45) Date of Patent: Jun. 11, 2024

(54) TECHNIQUE FOR LOCATING A TARGET TAG

(71) Applicant: Telefonaktiebolaget LM Ericsson (publ), Stockholm (SE)

(72) Inventors: András Veres, Budapest (HU); Zsófia Kallus, Budapest (HU); Zsolt Kenesi, Budapest (HU); Tamas Borsos, Budapest (HU); Péter Hága, Budapest (HU); Mate Szebenyei, Maglod (HU); Peter Vaderna, Budapest (HU); István Gódor, Budapest (HU); András Rácz, Budapest (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 484 days.

(21) Appl. No.: 17/292,130

(22) PCT Filed: Nov. 13, 2018

(86) PCT No.: PCT/EP2018/081067
§ 371 (c)(1),
(2) Date: May 7, 2021

(87) PCT Pub. No.: WO2020/098920
PCT Pub. Date: May 22, 2020

(65) Prior Publication Data
US 2021/0396835 A1 Dec. 23, 2021

(51) Int. Cl.
*G01S 5/00* (2006.01)
*G01S 5/02* (2010.01)
(Continued)

(52) U.S. Cl.
CPC .......... *G01S 5/0009* (2013.01); *G01S 5/0045* (2013.01); *G01S 5/0081* (2013.01); *G01S 5/0236* (2013.01); *H04W 4/029* (2018.02); *H04W 4/80* (2018.02)

(58) Field of Classification Search
CPC .... G01S 5/0009; G01S 5/0045; G01S 5/0081; G01S 5/0236; H04W 4/029; H04W 4/80
(Continued)

(56) References Cited

U.S. PATENT DOCUMENTS

2020/0005557 A1* 1/2020 Madaan ............. G06Q 20/3224
2023/0146947 A1* 5/2023 Shelton, IV ......... A61B 90/361
606/144

FOREIGN PATENT DOCUMENTS

CN 104029651 A * 9/2014 ......... G07C 9/00309
CN 107255794 A * 10/2017 ........... G01S 5/0036
(Continued)

*Primary Examiner* — Harry K Liu
(74) *Attorney, Agent, or Firm* — Sage Patent Group

(57) ABSTRACT

A technique for locating a target tag (110) using a short range radio based positioning system comprising a plurality of localization components (120) is provided, wherein the target tag (110) and the plurality of localization components (120) are configured to perform ranging measurements among each other using short range radio technology. A method implementation of the technique is performed by an orchestration component (100) of the positioning system and comprises sending, using long range radio technology, a ranging plan to the target tag (110) and one or more of the plurality of localization components (120), the ranging plan instructing the target tag (110) and the one or more of the plurality of localization components (120) to perform, using the short range radio technology, ranging measurements among each other enabling to locate the target tag (110).

16 Claims, 8 Drawing Sheets

(51) Int. Cl.
  *H04W 4/02* (2018.01)
  *H04W 4/029* (2018.01)
  *H04W 4/80* (2018.01)
(58) Field of Classification Search
  USPC .......................................................... 342/451
  See application file for complete search history.

(56) References Cited

FOREIGN PATENT DOCUMENTS

| | | | | |
|---|---|---|---|---|
| JP | 7242677 B2 * | 3/2023 | ......... | A61B 1/00011 |
| WO | 2017196583 A2 | 11/2017 | | |
| WO | 2017196584 A1 | 11/2017 | | |

* cited by examiner

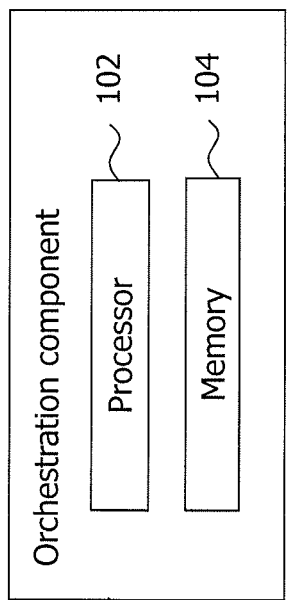
Fig. 1a
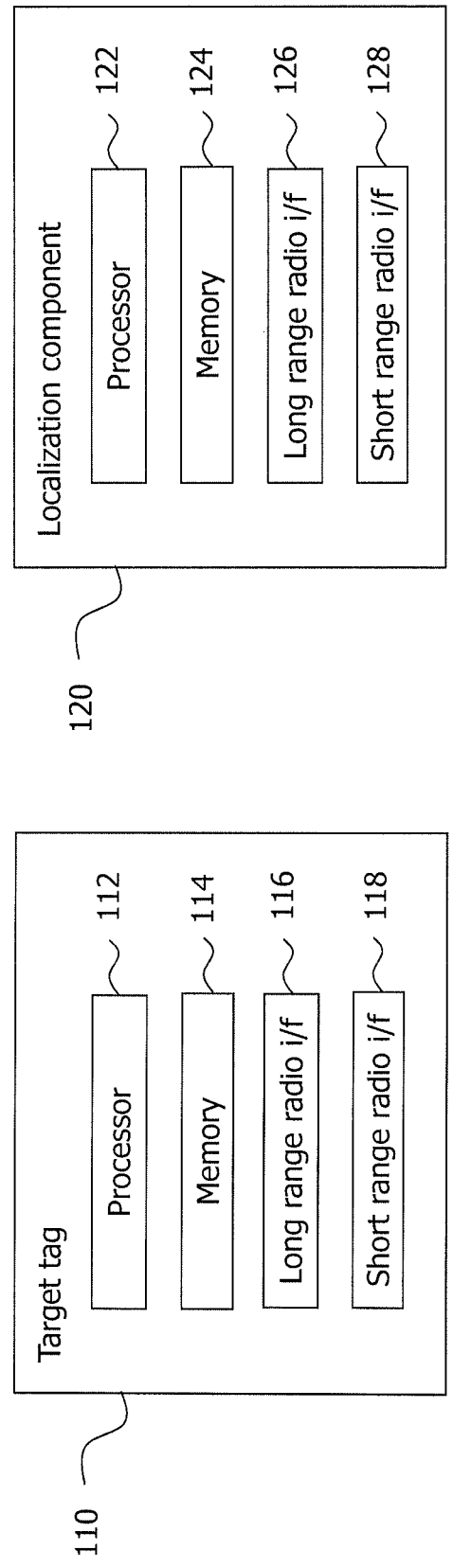
Fig. 1c
Fig. 1b

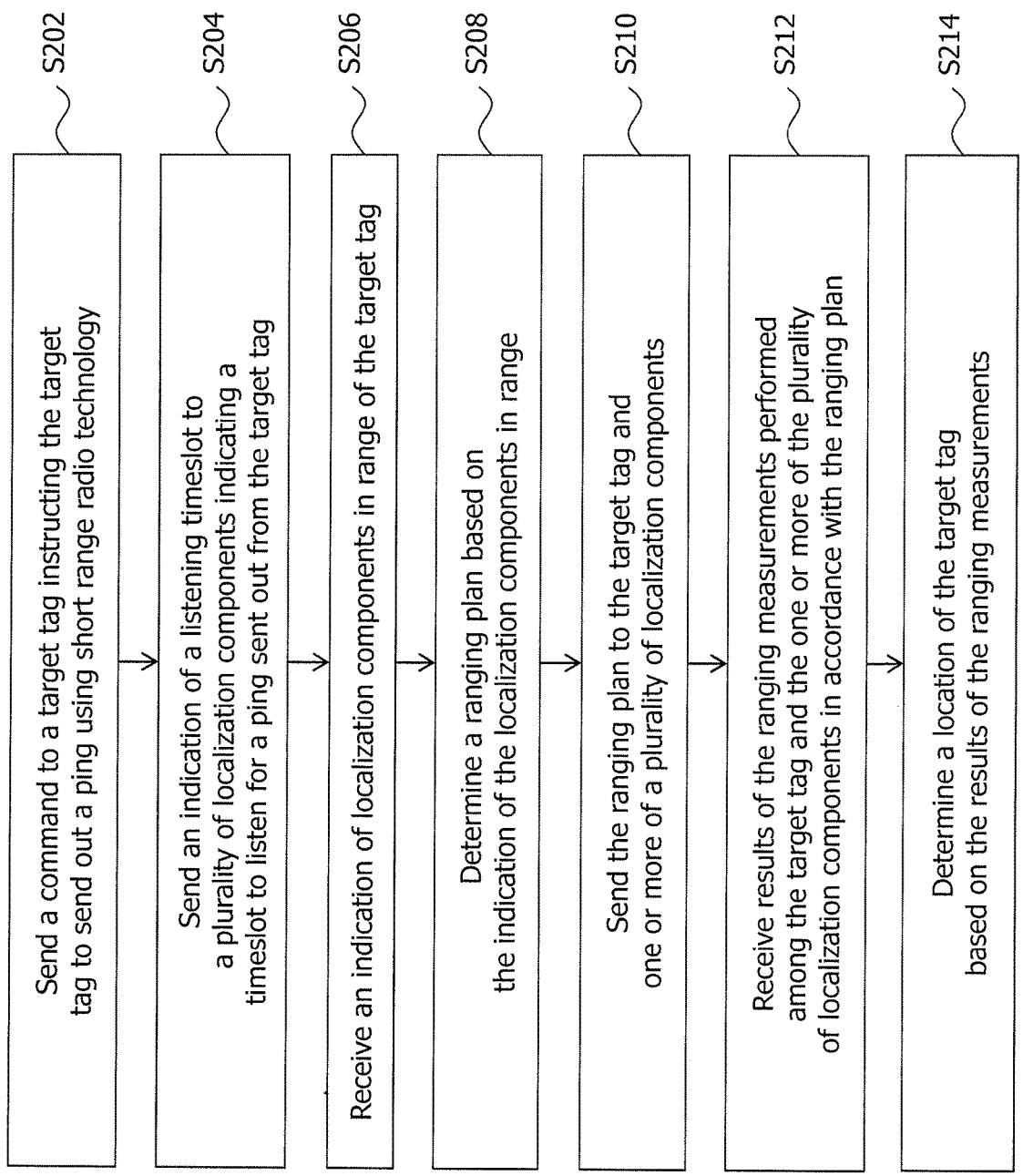

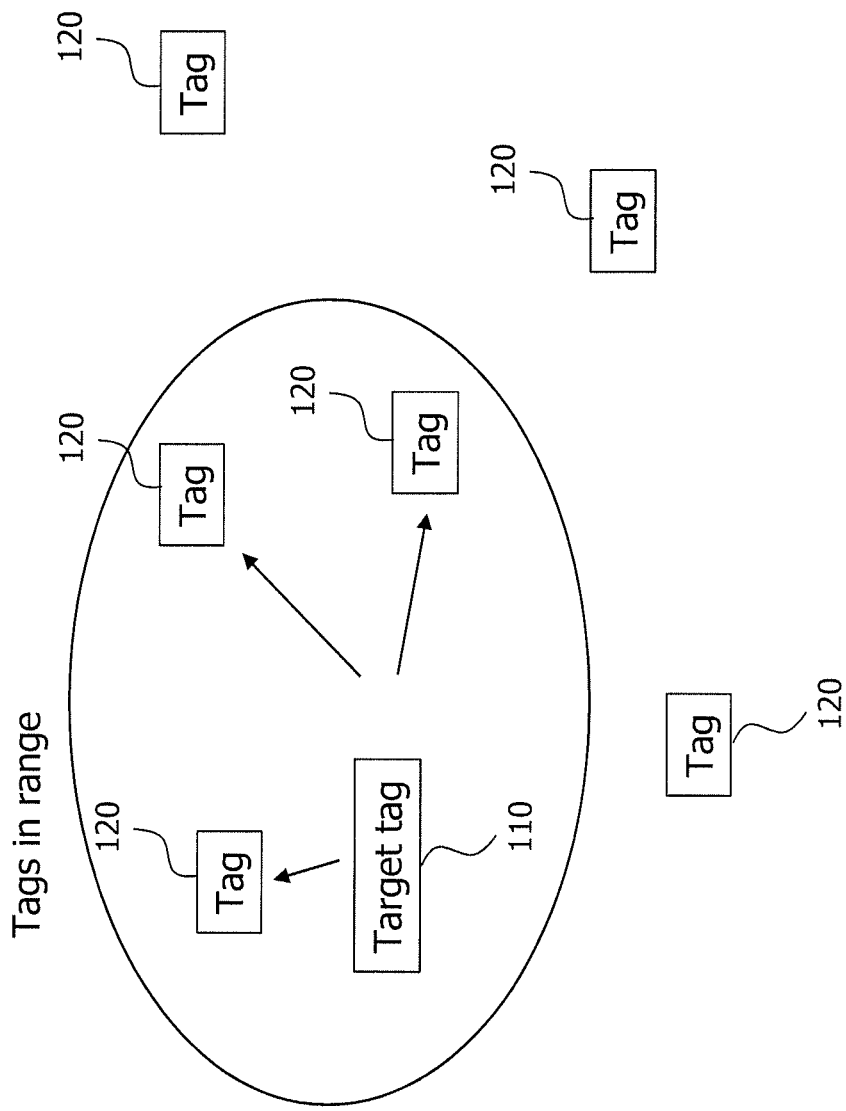

TECHNIQUE FOR LOCATING A TARGET TAG

TECHNICAL FIELD

The present disclosure generally relates to the field of positioning systems. In particular, a technique for locating a target tag using a short range radio based positioning system comprising a plurality of localization components is presented. The technique may be embodied in methods, computer programs, apparatuses and systems.

BACKGROUND

Many industries are faced with the problem of keeping track of a large number of objects in their premises, both indoors and outdoors. Such premises may include warehouses, factories, mines and workshops, for example, where the positions of objects may need to be tracked to know where the objects are and when the objects are moved. Existing solutions to address this problem include the use of Radio Frequency Identification (RFID) technology, where tags are used to log the identity of objects when they are moved or handled. Every time an action is performed with regard to an object, the position needs to be manually entered into the system. Other existing solutions include the use of Bluetooth or Wi-Fi beacons to measure the approximate distance towards reference beacons installed at fixed positions in the area to cover. Still other solutions include the use of impulse radio, such as Ultra Wideband (UWB) based positioning systems, for example, which use more precise Time of Flight (ToF) or Time Difference of Arrival (TDoA) based techniques and mathematical calculations to determine tag positions based thereon.

Both beacon and impulse radio based systems generally employ reference base stations called "anchors" to reach the objects using radio signals for positioning. More precisely, these systems generally comprise a fixedly deployed set of anchors (e.g., installed at ceilings or walls) and a variable set of movable tags that are attached to objects (e.g., workpieces in a factory) whose locations need to be determined. Anchors and tags can communicate using radio signals to perform two-way timing measurements of the time the signals travel between anchors and tags to thereby measure the distance therebetween. This process is called "ranging". The position of the tags can then be determined based on the ranging measurements, taking into consideration the known fixed coordinates of the anchors. In typical deployments, the ranging measurements performed between anchors and tags may be delivered to a cloud based positioning service, such as a location server, where the positions of the tags can be calculated based thereon.

Current systems generally suffer from the problem, however, that they require a high number of anchors to be deployed in order to have a minimum of three or four anchors visible from everywhere in the area to cover and to thereby ensure locatability of tags anywhere. Each of the anchors requires a dedicated installation and is typically powered from the mains or other wired means. Another problem arises in case of a high density of obstacles in the area to cover. In warehouses, for example, there may be lots of metallic structures that limit the radio coverage of anchors and, also, the objects themselves may block ranging signals, such as in case of boxes piled on top of each other, which may make it almost impossible for anchors to reach the objects using low power radio, such as UWB, in certain situations.

SUMMARY

Accordingly, there is a need for a technique for locating a target tag that avoids one or more of the problems discussed above, or other problems.

According to a first aspect, a method for locating a target tag using a short range radio based positioning system comprising a plurality of localization components is provided, wherein the target tag and the plurality of localization components are configured to perform ranging measurements among each other using short range radio technology. The method is performed by an orchestration component of the positioning system and comprises sending, using long range radio technology, a ranging plan to the target tag and one or more of the plurality of localization components, the ranging plan instructing the target tag and the one or more of the plurality of localization components to perform, using the short range radio technology, ranging measurements among each other enabling to locate the target tag.

The plurality of localization components may comprise at least one of an anchor of the positioning system and a tag locatable by the positioning system. The ranging plan may indicate at least one timeslot in which the ranging measurements are to be performed among the target tag and the one or more of the plurality of localization components. The method may further comprise sending, prior to sending the ranging plan, a command to the target tag using the long range radio technology instructing the target tag to send out a ping using the short range radio technology to identify, among the plurality of localization components, localization components in range. The command may indicate a timeslot in which the ping is to be sent out by the target tag. The method may further comprise sending, prior to sending the ranging plan, an indication of a listening timeslot to the plurality of localization components using the long range radio technology indicating a timeslot to listen for a ping sent out from the target tag using the short range radio technology. The method may further comprise receiving, using the long range radio technology, an indication of the localization components in range, and determining the ranging plan based on the indication of the localization components in range. The indication of the localization components in range may include, for each of the localization components in range, an indication of power at which the ping was received by the respective localization component in range.

Determining the ranging plan may include selecting the one or more of the plurality of localization components from the localization components in range. The ranging plan may be determined in consideration of at least one of minimizing the ranging measurements to be performed among the target tag and the one or more of the plurality of localization components, minimizing energy consumption among the target tag and the one or more of the plurality of localization components when performing the ranging measurements, sufficiency of power of each of the one or more of the plurality of localization components for performing the ranging measurements, and preference of anchors over tags among the one or more of the plurality of localization components. The method may further comprise receiving, using the long range radio technology, results of the ranging measurements performed among the target tag and the one or more of the plurality of localization components in accordance with the ranging plan. The method may further comprise determining a location of the target tag based on the results of the ranging measurements.

According to a second aspect, a method for locating a target tag using a short range radio based positioning system comprising a plurality of localization components is provided, wherein the target tag and the plurality of localization components are configured to perform ranging measurements among each other using short range radio technology. The method is performed by the target tag and comprises receiving, using long range radio technology, a ranging plan from an orchestration component of the positioning system, the ranging plan instructing the target tag to perform, using the short range radio technology, ranging measurements with one or more of the plurality of localization components enabling to locate the target tag.

The method according to the second aspect defines a method from a target tag's perspective which may be complementary to the method according to the first aspect. As such, those aspects described with regard to the method of the first aspect which are applicable to the method of the second aspect may be comprised by the method of the second aspect as well, and vice versa.

As in the method of the first aspect, the plurality of localization components may comprise at least one of an anchor of the positioning system and a tag locatable by the positioning system. The ranging plan may indicate at least one timeslot in which the ranging measurements are to be performed with the one or more of the plurality of localization components. Upon receiving the ranging plan, the target tag may switch into a sleep mode and wake up at the at least one timeslot in which the ranging measurements are to be performed with the one or more of the plurality of localization components. The method may further comprise receiving, prior to receiving the ranging plan, a command from the orchestration component using the long range radio technology instructing the target tag to send out a ping using the short range radio technology to identify, among the plurality of localization components, localization components in range. The command may indicate a timeslot in which the ping is to be sent out by the target tag. Upon receiving the command, the target tag may switch into a sleep mode and wake up at the timeslot in which the ping is to be sent out by the target tag. The method may further comprise sending out, using the short range radio technology, the ping in accordance with the command. The method may further comprise sending, using the long range radio technology, an indication of the localization components in range to the orchestration component. The method may further comprise performing, using the short range radio technology, the ranging measurements with the one or more of the plurality of localization components in accordance with the ranging plan. The method may further comprise sending, using the long range radio technology, results of the ranging measurements performed with the one or more of the plurality of localization components in accordance with the ranging plan to the orchestration component.

According to a third aspect, a method for locating a target tag using a short range radio based positioning system comprising a plurality of localization components is provided, wherein the target tag and the plurality of localization components are configured to perform ranging measurements among each other using short range radio technology. The method is performed by a localization component of the plurality of localization components and comprises receiving, using long range radio technology, a ranging plan from an orchestration component of the positioning system, the ranging plan instructing the localization component to perform, using the short range radio technology, a ranging measurement with the target tag to be used in locating the target tag.

The method according to the third aspect defines a method from a localization component's perspective which may be complementary to either the method according to the first aspect or the method according to the second aspect. As such, those aspects described with regard to the methods of the first and second aspects which are applicable to the method of the third aspect may be comprised by the method of the third aspect as well, and vice versa.

As in the methods of the first and second aspects, the plurality of localization components may comprise at least one of an anchor of the positioning system and a tag locatable by the positioning system. The ranging plan may indicate at least one timeslot in which the ranging measurement is to be performed with the target tag. Upon receiving the ranging plan, the localization component may switch into a sleep mode and wake up at the at least one timeslot in which the ranging measurement is to be performed with the target tag. The method may further comprise receiving, prior to receiving the ranging plan, an indication of a listening timeslot using the long range radio technology from the orchestration component indicating a timeslot to listen for a ping sent out from the target tag using the short range radio technology. Upon receiving the indication of the listening timeslot, the localization component may switch into a sleep mode and wake up at the listening timeslot. The method may further comprise receiving, using the short range radio technology, the ping from the target tag. The method may further comprise sending, using the long range radio technology, an indication that the localization component is in range of the target tag to the orchestration component. The indication that the localization component is in range of the target tag may include an indication of power at which the ping was received by the localization component. The method may further comprise performing, using the short range radio technology, the ranging measurement with the target tag in accordance with the ranging plan. The method may further comprise sending, using the long range radio technology, a result of the ranging measurement performed with the target tag in accordance with the ranging plan to the orchestration component.

According to a fourth aspect, a computer program product is provided. The computer program product comprises program code portions for performing the method of at least one of the first, the second and the third aspect when the computer program product is executed on one or more computing devices (e.g., a processor or a distributed set of processors). The computer program product may be stored on a computer readable recording medium, such as a semiconductor memory, DVD, CD-ROM, and so on.

According to a fifth aspect, an orchestration component for locating a target tag using a short range radio based positioning system comprising a plurality of localization components is provided, wherein the target tag and the plurality of localization components are configured to perform ranging measurements among each other using short range radio technology. The orchestration component is configured to perform any of the method steps presented herein with respect to the first aspect. The orchestration component may comprise at least one processor and at least one memory, wherein the at least one memory contains instructions executable by the at least one processor such that the orchestration component is operable to perform any of the method steps presented herein with respect to the first aspect.

According to a sixth aspect, a target tag to be located using a short range radio based positioning system comprising a plurality of localization components is provided, wherein the target tag and the plurality of localization components are configured to perform ranging measurements among each other using short range radio technology. The target tag is configured to perform any of the method steps presented herein with respect to the second aspect. The target tag may comprise at least one processor and at least one memory, wherein the at least one memory contains instructions executable by the at least one processor such that the target tag is operable to perform any of the method steps presented herein with respect to the second aspect.

According to a seventh aspect, a localization component for locating a target tag using a short range radio based positioning system comprising a plurality of localization components is provided, wherein the target tag and the plurality of localization components are configured to perform ranging measurements among each other using short range radio technology. The localization component is configured to perform any of the method steps presented herein with respect to the third aspect. The localization component may comprise at least one processor and at least one memory, wherein the at least one memory contains instructions executable by the at least one processor such that the localization component is operable to perform any of the method steps presented herein with respect to the third aspect.

According to an eighth aspect, there is provided a system comprising an orchestration component of the fifth aspect, a target tag of the sixth aspect and one or more localization components of the seventh aspect.

BRIEF DESCRIPTION OF THE DRAWINGS

Implementations of the technique presented herein are described herein below with reference to the accompanying drawings, in which:

FIGS. 1a to 1c illustrate exemplary compositions of an orchestration component, a target tag and a localization component according to the present disclosure;

FIG. 2 illustrates a method which may be performed by the orchestration component according to the present disclosure;

FIGS. 7a and 7b illustrate an exemplary selection of tags as localization components in range for use in a ranging plan according to the present disclosure.

DETAILED DESCRIPTION

Figure 3:
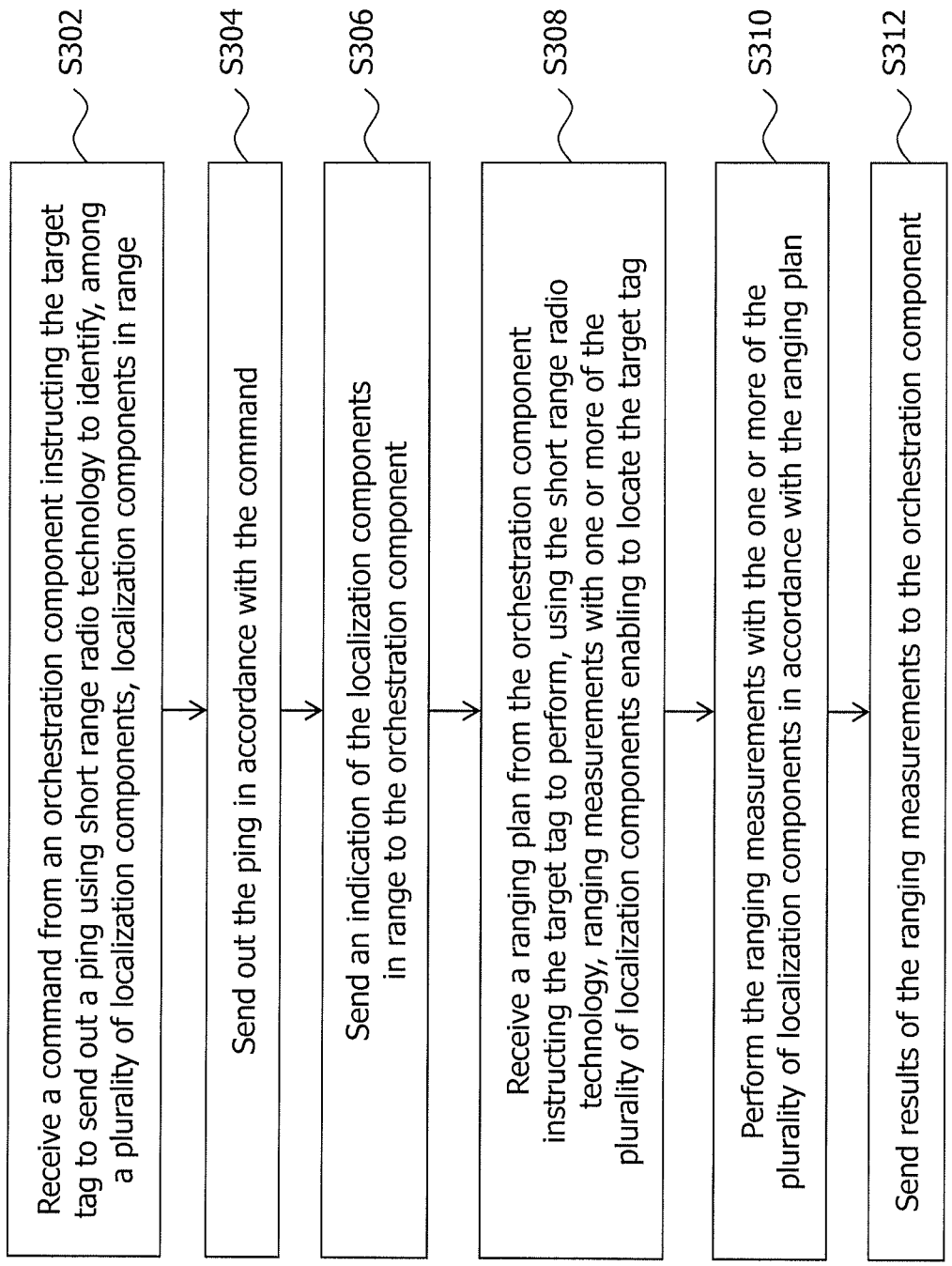
FIG. 3 illustrates a method which may be performed by the target tag according to the present disclosure.

In the following description, for purposes of explanation and not limitation, specific details are set forth in order to provide a thorough understanding of the present disclosure. It will be apparent to one skilled in the art that the present disclosure may be practiced in other embodiments that depart from these specific details.

Those skilled in the art will further appreciate that the steps, services and functions explained herein below may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present disclosure is described in terms of a method, it may also be embodied in one or more processors and one or more memories coupled to the one or more processors, wherein the one or more memories are encoded with one or more programs that perform the steps, services and functions disclosed herein when executed by the one or more processors.

FIG. 1a schematically illustrates an exemplary composition of an orchestration component 100 for locating a target tag using a short range radio based positioning system comprising a plurality of localization components, wherein the target tag and the plurality of localization components are configured to perform ranging measurements among each other using short range radio technology. The orchestration component 100 comprises at least one processor 102 and at least one memory 104, wherein the at least one memory 104 contains instructions executable by the at least one processor 102 such that the orchestration component 100 is operable to carry out the method steps described herein below with reference to the orchestration component.

FIG. 1b schematically illustrates an exemplary composition of a target tag 110 to be located using a short range radio based positioning system comprising a plurality of localization components, wherein the target tag 110 and the plurality of localization components are configured to perform ranging measurements among each other using short range radio technology. The target tag 110 comprises at least one processor 112 and at least one memory 114, wherein the at least one memory 114 contains instructions executable by the at least one processor 112 such that the target tag 110 is operable to carry out the method steps described herein below with reference to the target tag. It will be understood that, in other (more lightweight) implementations, the target tag may comprise—instead of processors and memories—an integrated circuit (IC), and optionally a memory coupled to the IC, enabling the target tag to carry out corresponding method steps. The target tag 110 further comprises a long range radio interface 116 for communication with an orchestration component (e.g., orchestration component 100) as well as a short range radio interface 118 for communication with the plurality of localization components.

FIG. 1c schematically illustrates an exemplary composition of a localization component 120 for locating a target tag using a short range radio based positioning system comprising a plurality of localization components, wherein the target tag and the plurality of localization components are configured to perform ranging measurements among each other using short range radio technology. The localization component 120 comprises at least one processor 122 and at least one memory 124, wherein the at least one memory 124 contains instructions executable by the at least one processor 122 such that the localization component 120 is operable to carry out the method steps described herein below with reference to the localization component. It will be understood that, in other (more lightweight) implementations, the localization component may comprise—instead of processors and memories—an IC, and optionally a memory coupled to the IC, enabling the localization component to carry out corresponding method steps. The localization component 120 further comprises a long range radio interface 126 for communication with an orchestration component (e.g., orchestration component 100) as well as a short range radio interface 128 for communication with the target tag (e.g., target tag 110).

FIG. 2 illustrates a method which may be performed by the orchestration component 100 according to the present disclosure. The method is dedicated to locating a target tag (e.g., target tag 110) using a short range radio based positioning system comprising a plurality of localization components (e.g., a plurality of instances of localization component 120), wherein the target tag and the plurality of localization components are configured to perform ranging measurements among each other using short range radio technology.

In brief, in step S202, the orchestration component 100 may send a command to the target tag using long range radio technology instructing the target tag to send out a ping using the short range radio technology to identify, among the plurality of localization components, localization components in range. In step S204, the orchestration component 100 may send an indication of a listening timeslot to the plurality of localization components using the long range radio technology indicating a timeslot to listen for a ping sent out from the target tag using the short range radio technology. In step S206, the orchestration component 100 may receive, using the long range radio technology, an indication of the localization components in range. In step S208, the orchestration component 100 may determine a ranging plan based on the indication of the localization components in range. In step S210, the orchestration component 100 may send, using the long range radio technology, the ranging plan to the target tag and one or more of the plurality of localization components, wherein the ranging plan instructs the target tag and the one or more of the plurality of localization components to perform, using the short range radio technology, ranging measurements among each other enabling to locate the target tag. In step S212, the orchestration component 100 may receive, using the long range radio technology, results of the ranging measurements performed among the target tag and the one or more of the plurality of localization components in accordance with the ranging plan and, in step S214, the orchestration component 100 may determine a location of the target tag based on the results of the ranging measurements.

The orchestration component 100 may be provided in a cloud computing environment and may correspond to a location server, for example. As such, it will be understood that the orchestration component 100 may be implemented on a physical computing unit or a virtualized computing unit, such as a virtual machine, for example. It will further be appreciated that the orchestration component 100 may not necessarily be implemented on a standalone computing unit, but may be implemented as components—realized in software and/or hardware—residing on multiple distributed computing units as well, such as in a cloud computing environment, for example. When it is said herein that the orchestration component 100 communicates with the target tag or the plurality of localization components "using long range radio technology", it will be understood that it is not necessarily the orchestration component 100 itself that comprises a long range radio interface to support such communication but that the over-the-air portion of the communication path between the orchestration component 100 and the target tag and the respective localization components is implemented using long range radio technology. As such, the long range radio interface on the side of the orchestration component 100 may be provided in a base station of a mobile communication network, for example, through which the orchestration component 100 may communicate with the target tag and the respective localization components.

The long range radio technology may correspond to radio technology that supports radio coverage over a longer distance (e.g., by a factor of 5, 10, 20 or more) than the short range radio technology. For example, the long range radio technology may support more than 100 meters radio coverage, preferably more than 500 meters, as compared to short range radio technology which may only support signal ranges within a few meters or tens of meters, such as less than 50, 20 or 10 meters, for example. The long range radio technology may correspond to mobile communication system technology, such as 4G or 5G network technology or Low Power Wide Area Network (LPWAN) technology, such as Long Term Evolution-Machine Type Communications (LTE-MTC), Narrowband Internet of Things (NB-IoT) or Extended Coverage Global System for Mobile Communications (EC-GSM) technology, representing licensed LPWAN technology, or SigFox and Long Range Wide Area Network (LoRaWAN) technology, representing unlicensed LPWAN technology. The short range radio technology, on the other hand, may be usable to perform local ranging measurements, such as ToF or TDoA ranging measurements, for (e.g., short distance) positioning purposes. The short range radio technology may correspond to impulse radio technology, such as UWB, for example, but is not limited thereto. It will be understood that it is also conceivable to use active radio technology for this purpose, such as Bluetooth, Bluetooth Low Energy (BLE), Wi-Fi or ZigBee, for example.

The target tag may be a tag to be located using the short range radio based positioning system. The target tag may be attached to an object and, therefore, the target tag may be used for locating an object to be found. For the purpose of locating the target tag, the target tag and the plurality of localization components may be configured to perform ranging measurements among each other using the short range radio technology, e.g., to determine distances therebetween. The results of the ranging measurements (e.g., the determined distances) may then be used to determine the location of the target tag by well-known mathematical calculations, which may be performed by a location server of the positioning system, for example. The ranging measurements may be performed using Two Way Ranging (TWR), ToF, TDoA or other advanced known ranging measurement techniques, for example.

Each of the plurality of localization components may correspond to an anchor of the positioning system or to a tag that is locatable by the positioning system. In other words, the plurality of localization components may comprise at least one of an anchor of the positioning system and a tag locatable by the positioning system. The tags among the plurality of localization components may have the same configuration as the target tag, i.e., in particular, the tags among the plurality of localization components may be configured to support both communication via the short range radio technology as well as via the long range radio technology, wherein the short range radio technology may be used for communication with the target tag, e.g., to perform ranging measurements therewith, and wherein the long range radio technology may be used for communication with the orchestration component. The target tag may in fact be one of a plurality of tags locatable by the positioning system. In other words, among the plurality of tags locatable by the positioning system, the target tag may represent the tag to be found, wherein the remaining tags may be used in addition to the anchors of the positioning system to perform ranging measurements with the target tag for the purpose of locating the same. It may thus be said that performing positioning of the target tag may not only be based on ranging measurements performed between anchors and the target tag but also based on ranging measurements performed between the target tag and other tags in the radio range of the target tag. As such, it will be understood that the number of localization components usable for locating the target tag may be increased beyond the number of anchors of the positioning system and, therefore, the likelihood of (and precision in) locating the target tag may be increased.

To be usable as localization components for locating the target tag, the tags among the plurality of localization components may be locatable by the positioning system. That is, although these tags may be movable, their current positions may be determinable by the positioning system so that their current positions can be used to determine the position of the target tag, i.e., similar to the anchors whose positions may generally be known. The anchors among the plurality of localization components may be installed at fixed positions (e.g., at the walls or ceilings) and may be powered via wired powering, such as from the mains, for example. The anchors may be configured to support—similar to the tags among the localization components—both communication via the short range radio technology as well as via the long range radio technology, wherein the short range radio technology may be used for communication with the target tag, e.g., to perform ranging measurements therewith, and wherein the long range radio technology may be used for communication with the orchestration component.

The current positions of the tags among the plurality of localization components may be determinable using the anchors among the plurality of localization components. More specifically, each of the anchors among the plurality of localization components may be configured to communicate with the tags among the plurality of localization components using the short range radio technology and perform ranging measurements therewith using the short range radio technology, e.g., to determine distances therebetween. Similar to determining the location of the target tag, the results of the ranging measurements (e.g., the determined distances) may then be used to determine the location of the respective tag by well-known mathematical calculations which may be performed by a location server of the positioning system.

In order to orchestrate (e.g., in order to optimally schedule) the ranging measurements to be performed among the one or more of the plurality of localization components and the target tag, the orchestration component 100 may send, in step S210, using the long range radio technology, the ranging plan to the target tag and the one or more of the plurality of localization components. As said, the ranging plan may instruct the target tag and the one or more of the plurality of localization components to perform, using the short range radio technology, ranging measurements among each other enabling to locate the target tag. In other words, the orchestration component 100 may determine the ranging plan in a manner so that ranging measurements are performed among the target tag and the one or more of the plurality of localization components whose results enable to locate the target tag, e.g., using the mathematical calculations mentioned above.

For power saving purposes, the ranging plan may indicate at least one timeslot in which the ranging measurements are to be performed among the target tag and the one or more of the plurality of localization components. In fact, while, due to their wired powering, the anchors among the localization components may always be on and their short range radio may be operating in receive mode all the time except when performing ranging measurements with tags, both the target tags and the tags among the plurality of localization components may be battery operated and, therefore, these tags may be in sleep mode when no action is required to thereby save power. In sleep mode, the tags may switch off at least one of their short range radio interface and long range radio interface. As an example, upon receiving the ranging plan, the tags may switch into a sleep mode and wake up at the at least one timeslot in which the ranging measurements are to be performed.

In order to be able to define the ranging plan in a suitable manner, the orchestration component 100 may collect information as to how the target tag may be located by support of the plurality of localization components. To this end, the orchestration component may send, in step S202, prior to sending the ranging plan, a command to the target tag using the long range radio technology instructing the target tag to send out a ping using the short range radio technology to identify, among the plurality of localization components, localization components in range (i.e., in radio range of the target tag). For power saving purposes, the command may indicate a timeslot in which the ping is to be sent out by the target tag, so that, upon receiving the command, the target tag may switch into a sleep mode and wake up at the future timeslot in which the ping is to be sent out. The orchestration component 100 may further send, in step S204, prior to sending the ranging plan, an indication of a listening timeslot to the plurality of localization components using the long range radio technology indicating a timeslot to listen for a ping sent out from the target tag using the short range radio technology. In this way, at least the tags among the localization components may, upon receiving the indication of the listening timeslot, switch into a sleep mode and wake up at the listening timeslot, again, to thereby save power.

The transmission time of the ping may therefore coincide with a synchronized future listening timeslot scheduled for the plurality of localization components. Generally, there may be several ways to ensure that the ping and the listening timeslots are aligned. The above-described approach of sending indications of the timeslot to both the target tag and the plurality of localization components may be one variant in which the timeslot is scheduled and synchronized by the orchestration component 100. In another variant, the orchestration component 100 may determine a subset of anchors among the localization components to listen in a certain future timeslot, wherein this set may depend on the approximate location of the target tag (e.g., in which hall or room the target tag is located), for example. It will be understood that other variants for ensuring alignment of the timeslots may generally be conceivable.

In response to sending out the command that instructs the target tag to invoke its ping transmission for the purpose of identifying localization components in range of the target tag, the orchestration component 100 may receive, in step S206, using the long range radio technology, an indication of the localization components in range and may determine, in step S208, the ranging plan based on the indication of the localization components in range. The indication of the localization components in range may be received from at least one of the target tag and the one or more of the plurality of localization components. The indication of the localization components in range may include, for each of the localization components in range, an indication of power at which the ping was received by the respective localization component in range. For example, when the ping sent out from the target tag was received by a set of other tags and anchors in range, these tags and anchors may report the measured receive power to the orchestration component 100 and the orchestration component 100 may consider these power levels in the determination of the ranging plan.

As said, the orchestration component 100 may determine the ranging plan in a manner so that ranging measurements are performed whose results enable locating the target tag. Determining the ranging plan may include selecting those localization components among the localization components in range which are most suited. Determining the ranging plan may thus include selecting the one or more of the plurality of localization components from the localization components in range. Determining the ranging plan may also include determining at which future timeslots the ranging measurements are to be performed so as to achieve power saving effects, as mentioned above. In particular, the ranging plan may be determined in consideration of at least one of (or, in other words, selecting the one or more of the plurality of localization components from the localization components in range may be performed in consideration of at least one of) minimizing the ranging measurements to be performed among the target tag and the one or more of the plurality of localization components, minimizing energy consumption among the target tag and the one or more of the plurality of localization components when performing the ranging measurements, sufficiency of power of each of the one or more of the plurality of localization components for performing the ranging measurements, and preference of anchors over tags among the one or more of the plurality of localization components. The ranging plan may thus be determined in way to save battery of the tags as much as possible, to perform as little ranging as possible and/or to use only tags as localization components that have sufficient power. Due to their fixed known positions and the wired powering, anchors may be preferred over tags as localization components used in the ranging exchanges to be performed (for tags, the current positions need to be determined, which means extra effort and waste of battery power).

As said, the ranging plan may be sent to the target tags and the localization components which are part of the ranging plan in step S210. This operation may last less than a few tens of milliseconds, after which the target tag and the tags among the plurality of localization components can go to sleep to save power. The target tag and the one or more of the plurality of localization components may then wake up at the scheduled time and perform, using the short range radio technology, the ranging measurements among each other in accordance with the ranging plan. As said, the ranging measurements may be performed using TWR, ToF, TDoA or other advanced known ranging measurement techniques, for example. Results of the ranging measurements performed may then be sent, from at least one of the target tag and the one or more of the plurality of localization components, to the orchestration component 100 using the long range radio technology. After reporting the results of the ranging measurements, the target tag and the one or more of the plurality of localization components may go to sleep mode again. Therefore, in step S212, the orchestration component 100 may receive, using the long range radio technology, results of the ranging measurements performed among the target tag and the one or more of the plurality of localization components in accordance with the ranging plan. In step S214, the orchestration component 100 may then determine a location of the target tag based on the results of the ranging measurements. As said above, the results of the ranging measurements may comprise distances determined between the respective localization components and the target tag and these distances may be used to determine the location of the target tag using well-known mathematical calculations. When the orchestration component 100 corresponds to a location server, corresponding location databases may be updated based on the determined location of the target tag.

In some cases, only a few objects may be missing at any point of time so that, typically, one such exchange of messages among the orchestration component, the target tag and the localization components may give a unique and precise position for the target tag. If the position of the target tag is found to be undetermined, the orchestration component 100 may repeat the procedure, e.g., using other location components in range of the target tag as part of the ranging plan, in order to possibly obtain a more precise position of the target tag.

FIG. 3 illustrates a method which may be performed by the target tag 110 according to the present disclosure. The method is dedicated to locating the target tag 110 using a short range radio based positioning method comprising a plurality of localization components (e.g., a plurality of instances of localization component 120), wherein the target tag and the plurality of localization components are configured to perform ranging measurements among each other using short radio range technology. The operation of the target tag 110 may be complementary to the operation of the orchestration component 100 described above in relation to FIG. 2 and, as such, aspects described above with regard to the operation of the target tag may be applicable to the operation of the target tag 110 described in the following as well. Unnecessary repetitions are thus omitted in the following.

As described above in relation to FIG. 2, the plurality of localization components may comprise at least one of an anchor of the positioning system and a tag locatable by the positioning system. In step S302, the target tag may receive a command from an orchestration component (e.g., orchestration component 100) using long range radio technology instructing the target tag 110 to send out a ping using the short range radio technology to identify, among the plurality of localization components, localization components in range. The command may indicate a timeslot in which the ping is to be sent out by the target tag 110. Upon receiving the command, the target tag 110 may switch into a sleep mode and wake up at the timeslot in which the ping is to be sent out by the target tag 110. In step S304, the target tag 110 may send out, using the short range radio technology, the ping in accordance with the command. In step S306, the target tag may send, using the long range radio technology, an indication of the localization components in range to the orchestration component. In step S308, the target tag 110 may receive, using the long range radio technology, a ranging plan from the orchestration component, wherein the ranging plan instructs the target tag 110 to perform, using the short range radio technology, ranging measurements with one or more of the plurality of localization components enabling to locate the target tag 110. The ranging plan may indicate at least one timeslot in which the ranging measurements are to be performed with the one or more of the plurality of localization components. Upon receiving the ranging plan, the target tag 110 may switch into a sleep mode and wake up at the at least one timeslot in which the ranging measurements are to be performed with the one or more of the plurality of localization components. In step S310, the target tag 110 may perform, using the short range radio technology, the ranging measurements with the one or more of the plurality of localization components in accordance with the ranging plan and, in step S312, the target tag 110 may send, using the long range radio technology, results of the ranging measurements performed with the one or more of the plurality of localization components in accordance with the ranging plan to the orchestration component.

Figure 4:
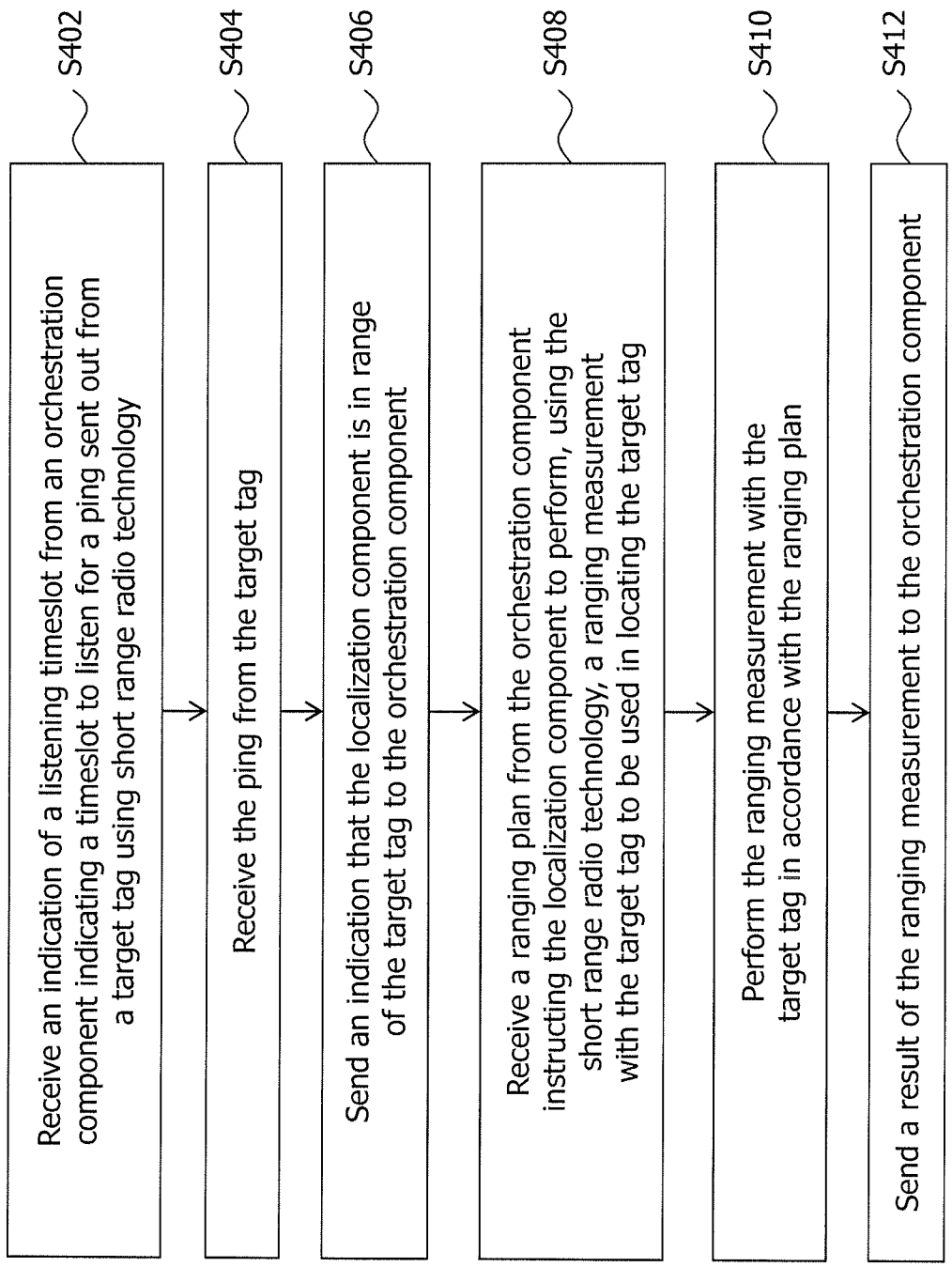
FIG. 4 illustrates a method which may be performed by a localization component according to the present disclosure.

FIG. 4 illustrates a method which may be performed by the localization component 120 according to the present disclosure. The method is dedicated to locating a target tag (e.g., target tag 110) using a short range radio based positioning method comprising a plurality of localization components (e.g., the localization component 120 being one of the plurality of localization components), wherein the target tag and the plurality of localization components are configured to perform ranging measurements among each other using short radio range technology. The operation of the localization component 120 may be complementary to the operation of the orchestration component 100 described above in relation to FIG. 2 and/or the operation of the target tag 110 described above in relation to FIG. 3 and, as such, aspects described above with regard to the operation of a localization component may be applicable to the operation of the localization component 120 described in the following as well. Unnecessary repetitions are thus omitted in the following.

As described above in relation to FIGS. 2 and 3, the plurality of localization components may comprise at least one of an anchor of the positioning system and a tag locatable by the positioning system. As such, the localization component 120 may either be an anchor of the positioning system or a tag locatable by the positioning system. In step S402, the localization component 120 may receive an indication of a listening timeslot using long range radio technology from an orchestration component (e.g., orchestration component 100) indicating a timeslot to listen for a ping sent out from the target tag using the short range radio technology. Upon receiving the indication of the listening timeslot, the localization component 120 may switch into a sleep mode and wake up at the listening timeslot. In step S404, the localization component 120 may receive, using the short range radio technology, the ping from the target tag. In step S406, the localization component 120 may send, using the long range radio technology, an indication that the localization component 120 is in range of the target tag to the orchestration component. The indication that the localization component 120 is in range of the target tag may include an indication of power at which the ping was received by the localization component 120. In step S408, the localization component 120 may receive, using the long range radio technology, a ranging plan from the orchestration component, wherein the ranging plan instructs the localization component 120 to perform, using the short range radio technology, a ranging measurement with the target tag to be used in locating the target tag. The ranging plan may indicate at least one timeslot in which the ranging measurement is to be performed with the target tag. Upon receiving the ranging plan, the localization component 120 may switch into a sleep mode and wake up at the at least one timeslot in which the ranging measurement is to be performed with the target tag. In step S410, the localization component 120 may perform, using the short range radio technology, the ranging measurement with the target tag in accordance with the ranging plan and, in step S412, the localization component 120 may send, using the long range radio technology, a result of the ranging measurement performed with the target tag in accordance with the ranging plan to the orchestration component.

Figure 5:
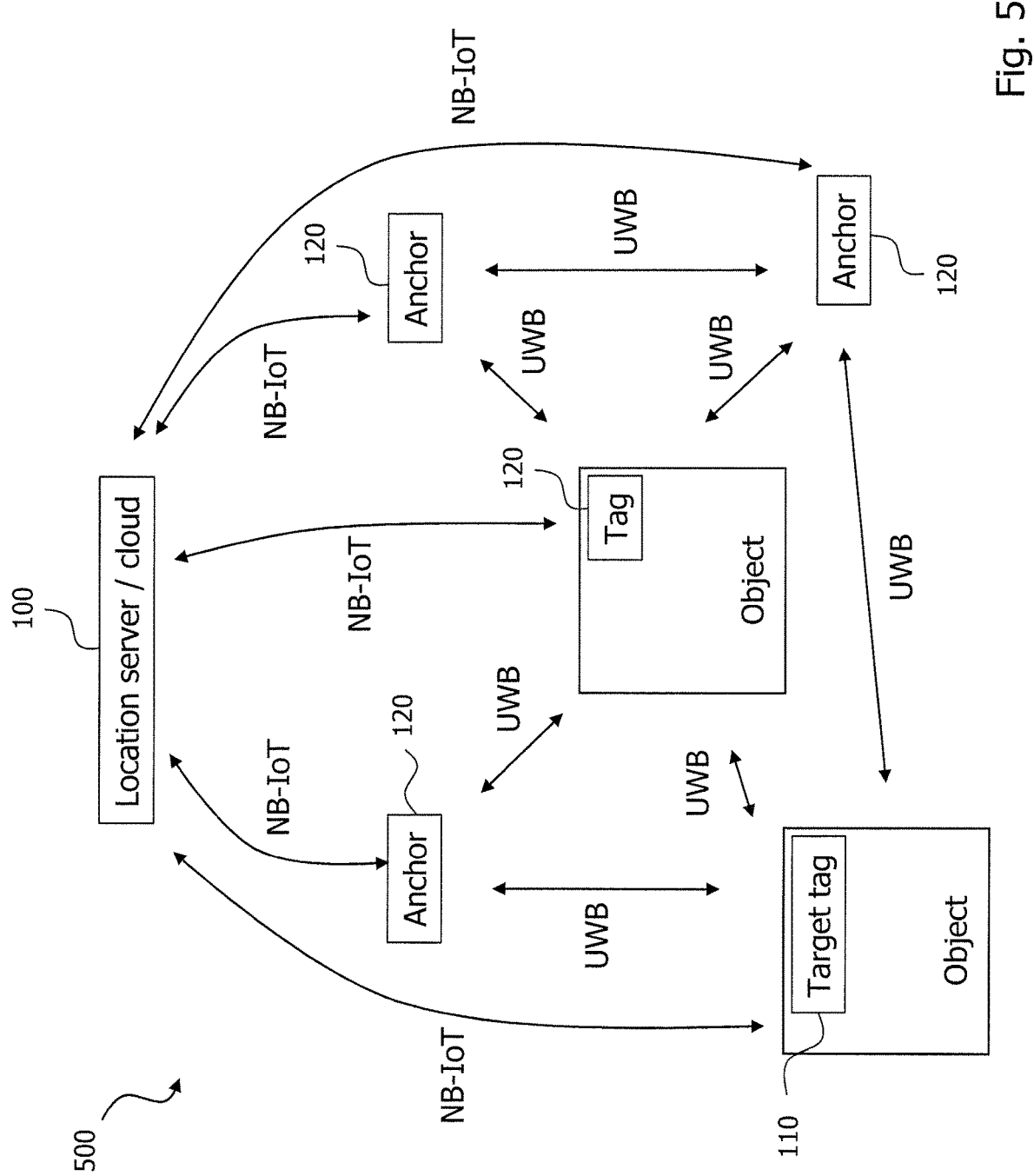
FIG. 5 illustrates an exemplary composition of a positioning system comprising the orchestration component, the target tag and one or more localization components according to the present disclosure.

FIG. 5 illustrates an exemplary composition of a short radio range based positioning system 500 comprising the orchestration component 100, the target tag 110 and a plurality of localization components 120. In the shown example, the orchestration component 100 is provided in the form of a location server available in a cloud and the target tag 110 is attached to an object to be found. The plurality of localization components 120 include both anchors as well as tags that are locatable by the positioning system through ranging measurements performed with the anchors. Both the target tag 110 and the plurality of localization components 120 communicate with the orchestration component 100 using long range radio technology which, in the shown example, is NB-IoT. The localization component 120 and the target tag 110, on the other hand, communicate among each other using short range radio technology which, in the shown example, is UWB and which allows them to perform short distance ranging measurements among each other.

Figure 6:
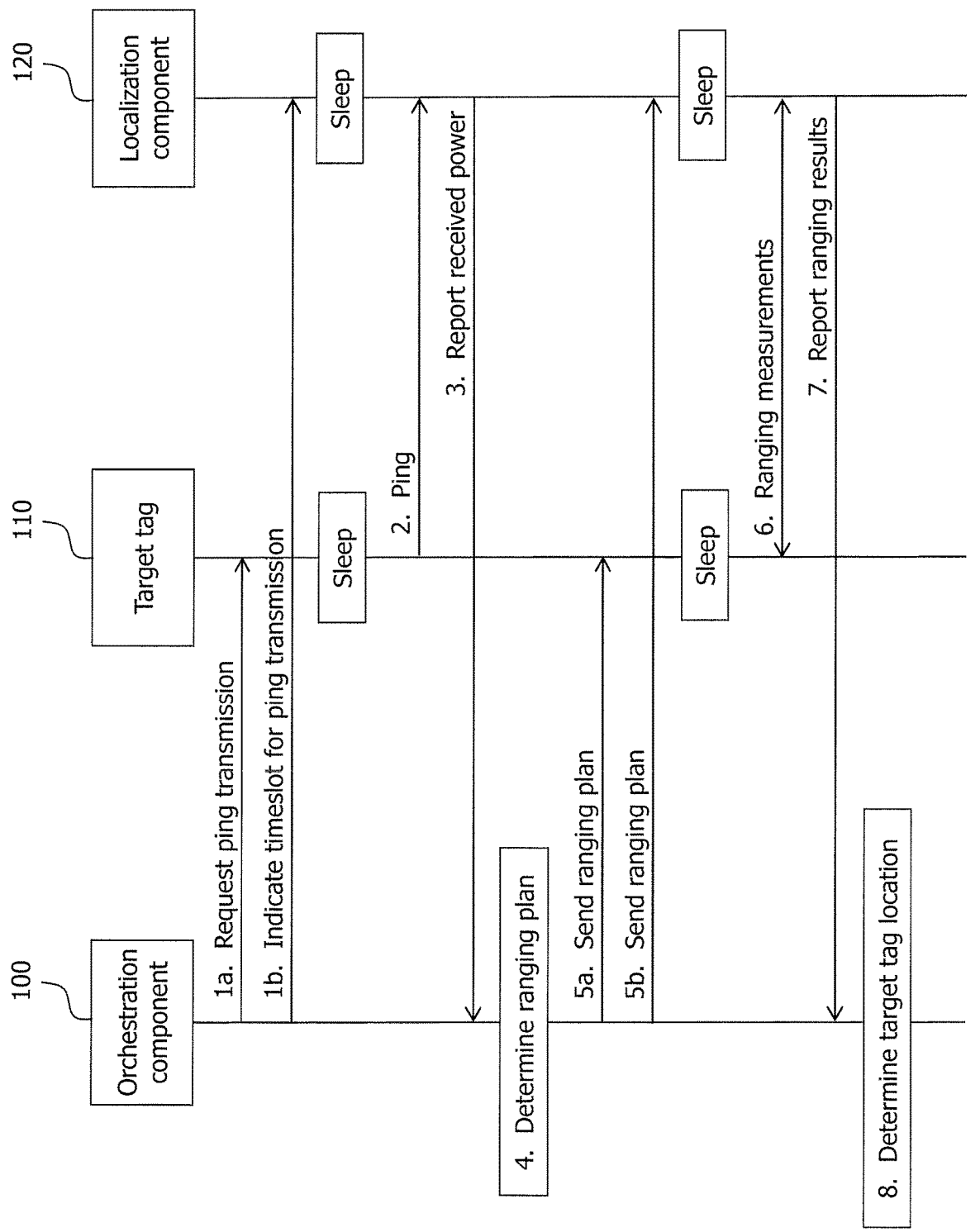
FIG. 6 illustrates a signaling diagram of an exemplary interaction between the orchestration component, the target tag and one or more localization components according to the present disclosure.

FIG. 6 illustrates a signaling diagram of an exemplary interaction between the orchestration component 100, the target tag 110 and a localization component 120 in accordance with the technique presented above. In the figure, it will be understood that the localization component 120 is merely representative of one of a plurality of localization components 120 of the positioning system and that, therefore, the messages exchanged with the localization component 120 may equally be exchanged in parallel with other localization components 120 of the positioning system.

Figure 7B:
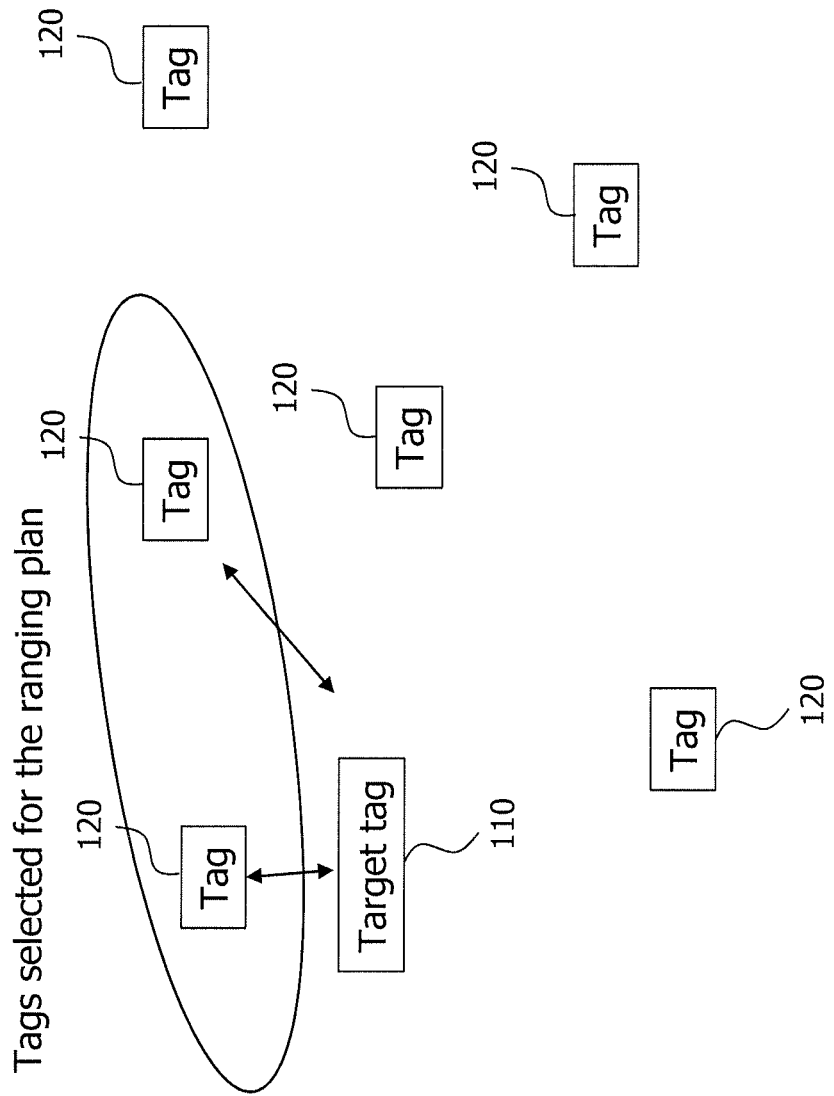

In the interaction, in step 1a, the orchestration component 100 may request a ping transmission by the target tag 110 in accordance with steps S202 and S302 described above and, in step 1b, the orchestration component 100 may indicate a listen timeslot for the ping to the localization component 120 in accordance with steps S204 and S402 described above. Both the target tag 110 and the localization component 120 may then go to sleep and wake up at the time scheduled for the transmission of the ping. The target tag 110 may then, in step 2, send out the ping in accordance with steps S304 and S404 described above, wherein the localization component 120 may send, to the orchestration component 100, in step 3, an indication that it is in range of the target tag including an indication of the power at which the ping was received in accordance with steps S406 and S206 described above. The orchestration component 100 may then determine, in step 4, a ranging plan based on the indication of the localization components in range (as received from a plurality of localization components 120) in accordance with step S208 described above. As part of determining the ranging plan, the orchestration component may select those among the localization components in range which are most suited for the purpose performing ranging measurements with the target tag to enable locating the same. FIGS. 7a and 7b provide an exemplary illustration of such selection, wherein three tags are determined as localization components in range of the target tag 110, wherein only two of the tags are selected as suitable localization components to be included in the ranging plan. In steps 5a and 5b, the orchestration component 100 may send the ranging plan, in accordance with steps S210, S308 and S408 described above, to the target tag 110 and to the localization component 120 (more specifically, to a plurality of localization components 120), both of which may then go to sleep. At step 6, the target tag 110 and the localization component 120 (more specifically, a plurality of localization components 120) may wake up and perform, in accordance with steps S310 and S410 described above, ranging measurements among each other in accordance with the ranging plan. In step 7, the localization component 120 (more specifically, a plurality of localization components 120) may report the results of the ranging measurements to the orchestration component 100 in accordance with steps S412 and S212 described above and, in step 8, the orchestration component 100 may determine the location of the target tag based on the results of the ranging measurements in accordance with step S214 described above.

As has become apparent from the above, the present disclosure provides a technique for locating a target tag using a short range radio based positioning system. The technique may be used to locate objects in large indoor or outdoor spaces containing many thousands of objects, for example. According to the presented technique, two separate communication technologies may be used, namely a (e.g., low power) long range radio technology for orchestration to optimally schedule a target tag positioning procedure, which is then performed using (e.g., low power) short range radio technology. As a result, the positioning system may utilize the ranging capability of other tags in range in order to find a missing tag, thereby greatly reducing the cost of infrastructure. In fact, due to the use of locatable tags as additional localization components (i.e., further to the anchors of the positioning system), complete anchor coverage may not be needed. The technique presented herein may significantly improve the probability of successfully finding objects, such as in extremely packed warehouses or other indoor or outdoor places with lots of objects and difficult to cover areas. Coverage may even be achieved beyond large piles of objects potentially blocking short range radio signals. As the ranging transmissions may be orchestrated from a central node, extremely high object density may be achieved. Further, by the ranging plan, the system may determine a set of tags and anchors that should be used for a future ranging exchange and, based on the obtained pairwise ranging measurements, the system may determine the exact position of the target tag to be found. By scheduling the timeslots for the corresponding message exchange, a very low power operation can be achieved, while the likelihood of finding an object is still given. For example, the radios may generally be switched off and may only be switched on for a very short period of time, achieving typically less than 0.01% activity, for example, resulting in very long tag battery life of potentially several years.

It is believed that the advantages of the technique presented herein will be fully understood from the foregoing description, and it will be apparent that various changes may be made in the form, constructions and arrangement of the exemplary aspects thereof without departing from the scope of the invention or without sacrificing all of its advantageous effects. Because the technique presented herein can be varied in many ways, it will be recognized that the invention should be limited only by the scope of the claims that follow.

The invention claimed is:

1. A method for locating a target tag using a short range radio based positioning system comprising a plurality of localization components, the target tag and the plurality of localization components being configured to perform ranging measurements among each other using short range radio technology, the method comprising an orchestration component of the positioning system:
   sending, using long range radio technology, a ranging plan to the target tag and one or more of the plurality of localization components, the ranging plan instructing the target tag and the one or more of the plurality of localization components to perform, using the short range radio technology, ranging measurements among each other enabling to locate the target tag;
   receiving, using the long range radio technology, an indication of the localization components in range; and
   determining the ranging plan based on the indication of the localization components in range.

2. The method of claim 1, wherein the ranging plan indicates at least one timeslot in which the ranging measurements are to be performed among the target tag and the one or more of the plurality of localization components.

3. The method of claim 1, further comprising sending, prior to sending the ranging plan, a command to the target tag using the long range radio technology instructing the target tag to send out a ping using the short range radio technology to identify, among the plurality of localization components, localization components in range.

4. The method of claim 3, wherein the command indicates a timeslot in which the ping is to be sent out by the target tag.

5. The method of claim 1, further comprising sending, prior to sending the ranging plan, an indication of a listening timeslot to the plurality of localization components using the long range radio technology indicating a timeslot to listen for a ping sent out from the target tag using the short range radio technology.

6. The method of claim 1, wherein the indication of the localization components in range includes, for each of the localization components in range, an indication of power at which a ping, sent by the target tag using the short range radio technology, was received by the respective localization component in range.

7. The method of claim 1, wherein determining the ranging plan includes selecting the one or more of the plurality of localization components from the localization components in range.

8. The method of claim 1, wherein the ranging plan is determined based on at least one of:
   minimizing the ranging measurements to be performed among the target tag and the one or more of the plurality of localization components;
   minimizing energy consumption among the target tag and the one or more of the plurality of localization components when performing the ranging measurements;
   sufficiency of power of each of the one or more of the plurality of localization components for performing the ranging measurements; or
   preference of anchors over tags among the one or more of the plurality of localization components.

9. A method for locating a target tag using a short range radio based positioning system comprising a plurality of localization components, the target tag and the plurality of localization components being configured to perform ranging measurements among each other using short range radio technology, the method comprising the target tag:
   receiving, using long range radio technology, a ranging plan from an orchestration component of the positioning system, the ranging plan instructing the target tag to perform, using the short range radio technology, ranging measurements with one or more of the plurality of localization components enabling to locate the target tag, wherein, upon receiving the ranging plan, the target tag switches into a sleep mode and wakes up at the at least one timeslot in which the ranging measurements are to be performed with the one or more of the plurality of localization components.

10. The method of claim 9, wherein the ranging plan indicates at least one timeslot in which the ranging measurements are to be performed with the one or more of the plurality of localization components.

11. The method of claim 9, further comprising receiving, prior to receiving the ranging plan, a command from the orchestration component using the long range radio technology instructing the target tag to send out a ping using the short range radio technology to identify, among the plurality of localization components, localization components in range.

12. The method of claim 11, wherein the command indicates a timeslot in which the ping is to be sent out by the target tag.

13. The method of claim 12, wherein, upon receiving the command, the target tag switches into a sleep mode and wakes up at the timeslot in which the ping is to be sent out by the target tag.

14. The method of claim 9, further comprising sending, to the orchestration component and using the long range radio technology, an indication of the localization components in range.

15. A method for locating a target tag using a short range radio based positioning system comprising a plurality of localization components, the target tag and the plurality of localization components being configured to perform ranging measurements among each other using short range radio technology, the method comprising a localization component of the plurality of localization components:

receiving, using long range radio technology, a ranging plan from an orchestration component of the positioning system, the ranging plan instructing the localization component to perform, using the short range radio technology, a ranging measurement with the target tag to be used in locating the target tag; and receiving from the orchestration component, prior to receiving the ranging plan and using the long range radio technology, an indication of a listening timeslot to listen for a ping sent out from the target tag using the short range radio technology, wherein, upon receiving the indication of the listening timeslot, the localization component switches into a sleep mode and wakes up at the listening timeslot.

16. The method of claim 15, further comprising receiving, using the short range radio technology, a ping sent out from the target tag using the short range radio technology.

* * * * *